(12) United States Patent
Pokupec (10) Patent No.: US 7,954,834 B2
(45) Date of Patent: Jun. 7, 2011

(54) LINKAGE FOR A VEHICLE SUSPENSION

(76) Inventor: Douglas Pokupec, Burlington (CA)

( * ) Notice: Subject to any disclaimer, the term of this patent is extended or adjusted under 35 U.S.C. 154(b) by 141 days.

(21) Appl. No.: 12/217,253

(22) Filed: Jul. 3, 2008

(65) Prior Publication Data

US 2010/0001485 A1   Jan. 7, 2010

(51) Int. Cl.
*B60G 3/04* (2006.01)

(52) U.S. Cl. ....... 280/124.134; 280/124.1; 280/124.128; 280/124.133; 280/124.153; 16/354

(58) Field of Classification Search ............... 280/124.1, 280/124.128, 124.133, 124.134, 124.153; 16/354
See application file for complete search history.

(56) References Cited

U.S. PATENT DOCUMENTS

| | | | | |
|---|---|---|---|---|
| 1,290,293 A * | 1/1919 | Morski | ........................ | 267/250 |
| 1,397,922 A * | 11/1921 | Cornelison | ............ | 280/124.153 |
| 1,989,837 A * | 2/1935 | Walters | ........................ | 180/361 |
| 2,024,199 A * | 12/1935 | Barnes et al. | ................ | 180/357 |
| 2,836,014 A * | 5/1958 | Calderwood | ................ | 451/137 |
| 5,269,048 A * | 12/1993 | Pazmany | ........................ | 16/354 |
| 6,142,495 A * | 11/2000 | Kim | ........................ | 280/124.111 |
| 6,926,363 B2 * | 8/2005 | Yamashita | ................... | 297/366 |
| 7,392,998 B2 * | 7/2008 | Runkel | ................... | 280/124.157 |
| 7,617,569 B2 * | 11/2009 | Liao | ................................ | 16/334 |
| 2003/0177607 A1 * | 9/2003 | Pelletier | ........................ | 16/354 |
| 2006/0208446 A1 * | 9/2006 | Runkel | ................... | 280/124.128 |
| 2008/0168623 A1 * | 7/2008 | Brouwer et al. | ................ | 16/354 |
| 2008/0277894 A1 * | 11/2008 | Runkel | ................... | 280/124.128 |
| 2009/0044377 A1 * | 2/2009 | Liang et al. | ..................... | 16/354 |
| 2009/0241290 A1 * | 10/2009 | Jones et al. | ..................... | 16/291 |

OTHER PUBLICATIONS

Involute Gear Wikipedia entry. [online]. Apr. 15, 2005 [retrieved on Apr. 23, 2010]. Retrieved from the Internet: <URL: http://web.archive.org/web/20050415214510/http://en.wikipedia.org/wiki/Involute_gear>.*

* cited by examiner

*Primary Examiner* — Paul N. Dickson
*Assistant Examiner* — Barry Gooden, Jr.

(57) ABSTRACT

A linkage for connecting a frame of a vehicle to an unsprung mass component of the vehicle, includes:
  a first portion connectable to the frame, and includes a first toothed surface;
  a second portion connectable to an unsprung mass component, and includes a second toothed surface,
  where the first portion is rotatably connected to the second portion and configured to be rotatable between the first toothed surface and the second toothed surface, and where the first toothed surface and the second toothed surface are configured to mesh with each other and maintain engagement.

28 Claims, 14 Drawing Sheets

LINKAGE FOR A VEHICLE SUSPENSION

BACKGROUND OF THE INVENTION

Generally, the present invention relates to a vehicle. More particularly, the present invention relates to a vehicle with suspension. Vehicles with suspension typically require suspension links to connect a vehicles frame to unsprung mass components of the vehicle.

SUMMARY OF THE INVENTION

Embodiments of the present invention provide a link between the frame and an unsprung mass component of a land vehicle with suspension.

According to an embodiment of the present invention, a linkage for connecting a frame of a vehicle to an unsprung mass component of the vehicle comprises, a first portion connectable to the vehicle frame and a second portion connectable to an unsprung mass component of the vehicle. The first portion further comprises a first toothed surface and the second portion further comprises a second toothed surface. The first portion is rotatably connected to the second portion and configured to be rotatable between the first toothed surface and the second toothed surface, and the first toothed surface and the second toothed surface are configured to mesh with each other and maintain engagement.

In one aspect, the first portion comprises a first rigid connection to the frame. In one aspect, the first portion comprises a first rotatable connection to the frame, the first rotatable connection further comprises one first rotational axis. In one aspect, the first rotational axis is substantially perpendicular to a horizontal plane of the vehicle. In one aspect, the first rotatable connection comprises a resilient bushing. In one aspect, the first rotatable connection comprises a bearing. In one aspect, the second portion comprises a second rigid connection to the unsprung mass component. In one aspect, the second portion comprises a second rotatable connection to the unsprung mass component. In one aspect, the second rotatable connection comprises one second rotational axis. In one aspect, the second rotational axis is substantially parallel to a horizontal plane of the vehicle. In one aspect, the second rotatable connection comprises a resilient bushing. In one aspect, the second rotatable connection comprises a bearing. In one aspect, the second portion comprises a third rotatable connection, the third rotatable connection comprising a plurality of fourth rotational axis. In one aspect, the first toothed surface comprises at least one tooth and the second toothed surface comprises at least two teeth. In one aspect, the second toothed surface comprises at least one tooth and the first toothed surface comprises at least two teeth. In one aspect, the first toothed surface comprises an involute gear tooth profile.

In one aspect, the second toothed surface comprises an involute gear tooth profile. In one aspect, the first portion further comprises a first surface, and the second portion further comprises a second surface, the first surface is configured to slide against the second surface and maintain engagement between the first toothed surface and the second toothed surface. In one aspect, the first surface comprises a bearing. In one aspect, the second surface comprises a bearing. In one aspect, the first portion comprises a plurality of the first surface and the second portion comprises a plurality of the second surface. In one aspect, the first portion is rotatably connected to the second portion about a third rotational axis between the first toothed surface and the second toothed surface. In one aspect, the third rotational axis is substantially parallel to the horizontal plane of the vehicle. In one aspect, the linkage further comprises a resilient portion, the resilient portion configured to resiliently attach the first portion to the second portion.

In another embodiment, a linkage for connecting a frame of a vehicle to an unsprung mass component of the vehicle comprises, a first portion connectable to the vehicle frame and a second portion connectable to an unsprung mass component of the vehicle. The first portion further comprises a first surface and the second portion further comprises a second surface. The first portion is rotatably connected to the second portion and configured to be rotatable between the first surface and the second surface, and the first surface and the second surface are configured to mesh with each other and maintain engagement.

In another embodiment, a vehicle suspension system includes a vehicle further comprising a frame, an unsprung mass component, and the linkage. The linkage is connected between the frame and the unsprung mass component of the vehicle.

BRIEF DESCRIPTION OF THE DRAWINGS

FIG. 1c shows a perspective exploded view of the linkage shown in FIG. 1a.

DETAILED DESCRIPTION OF THE PREFERRED EMBODIMENTS

In the following description, the use of "a", "an", or "the" can refer to the plural. All examples given are for clarification only, and are not intended to limit the scope of the invention.

The term "linkage" is used to describe a member which typically connects a vehicles frame to an unsprung mass component of the vehicle. "Linkage" may also refer to components of a vehicle such as an a-arm, a control arm, a radius rod, a panhard rod, trailing arm, swing arm, and truck arm but not limited to these.

In a land vehicle with a suspension, such as an automobile, a motorcycle, or a bicycle, "unsprung mass component" may also refer to components of the vehicle such as a wheel, a wheel carrier, an axle, a spindle, a strut and a hub but not limited to these.

An advantage to the embodiments shown is that the suspension link may have a variable pivot location in effect at the vehicle frame connection and may also have a variable pivot location in effect at the unsprung mass component connection.

It is understood that any ordinary person skilled in the art understands that the pivot locations of a member which connects a vehicles frame to its unsprung mass components influences a vehicles roll and pitch characteristics of a four wheeled vehicle and pitch characteristics of a two wheeled vehicle.

Figure 1A:
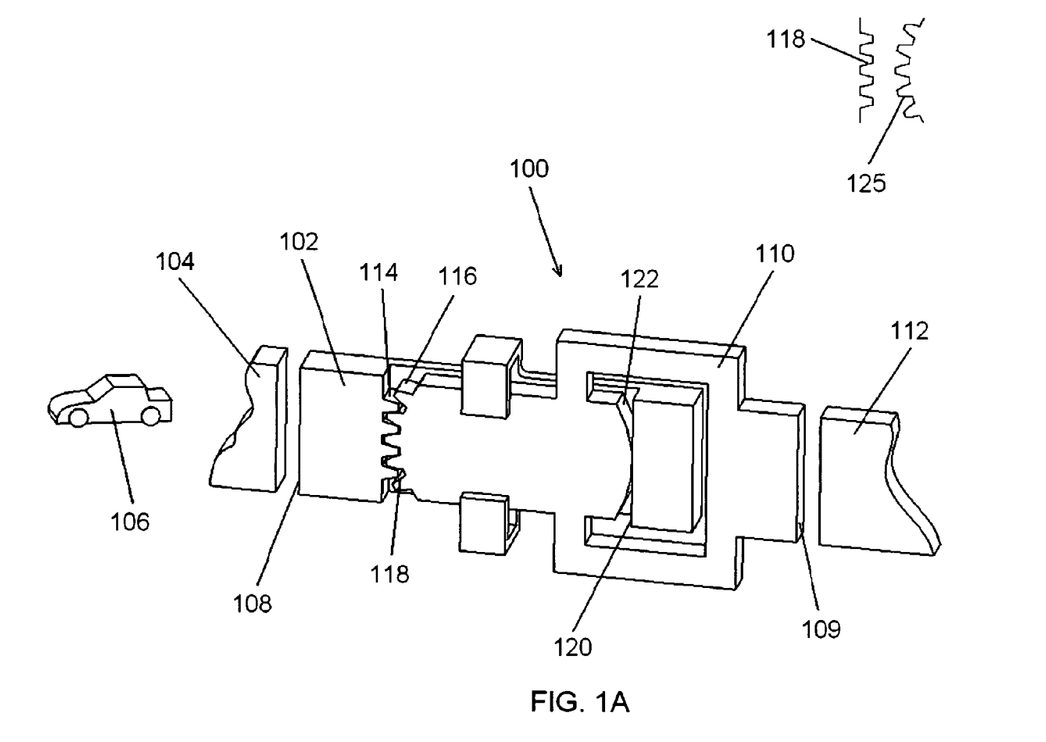
FIG. 1a shows a perspective view of the linkage according to a preferred embodiment.
Figure 1B:
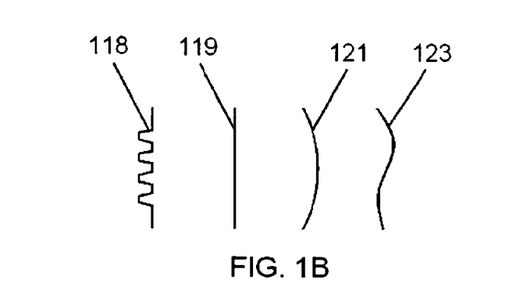
FIG. 1b shows a side view of toothed profiles of the linkage according to a preferred embodiment.

Referring to FIG. 1, according to an embodiment, a linkage 100 includes a first portion 102 which is connectable to a frame 104 of a vehicle 106. The first portion 102 may be connected to the frame 104 with a first rigid connection 108. The linkage 100 further includes a second portion 110 which is connectable to an unsprung mass component 112 of the vehicle 106. The second portion 110 may be connected to an unsprung mass component 112 of the vehicle 106 with a second rigid connection 109. The first portion 102 comprises a first toothed surface 114. The second portion 110 comprises a second toothed surface 116. The first portion 102 is rotatably connected to the second portion 110 between the first toothed surface 114 and the second toothed surface 116. The first toothed surface 114 and the second toothed surface 116 may comprise gear tooth profile 118 capable of meshing with each other. The gear tooth profile 118 may further comprise an involute gear tooth profile 125. The first toothed surface 114 and second toothed surface 116 are not limited to gear tooth profile 118 as other profiles capable of meshing may be used. The first toothed surface 114 and second toothed surface 116 may include profiles shown in FIG. 1b. These profiles are shown without teeth for simplicity purposes and may include a straight 119, a curved 121, a multiple curved 123, and a straight gear toothed profile 118. The first portion 102 further comprises a first surface 120 and the second portion 110 further comprises a second surface 122. The first surface 120 and the second surface 122 are configured to slide against each other in order to regulate backlash and maintain engagement between the first toothed surface 114 and the second toothed surface 116.

Figure 1C:
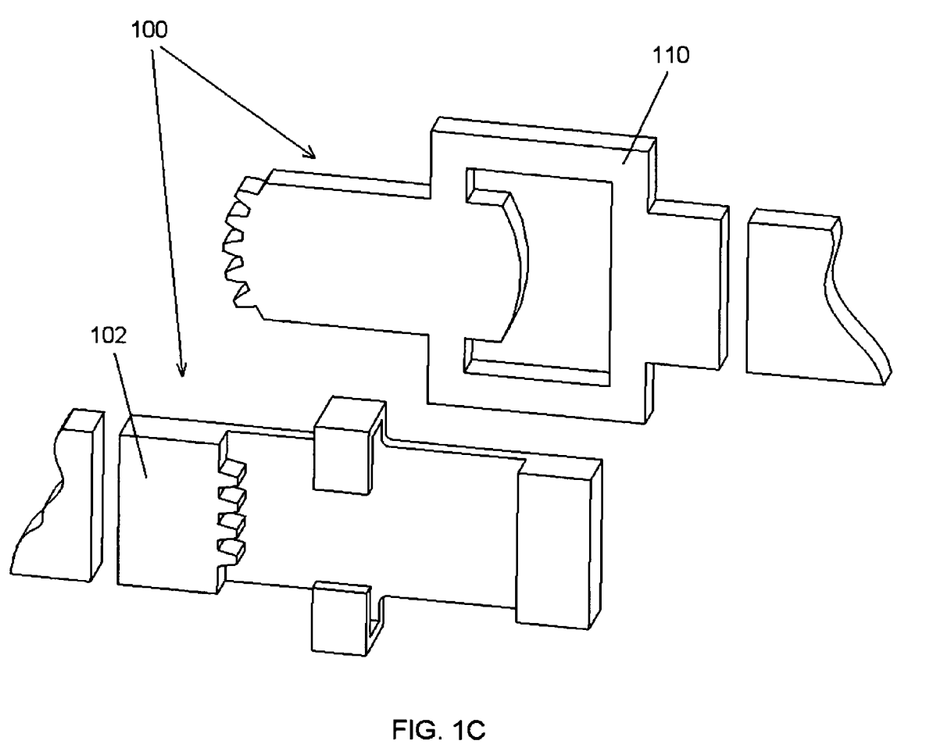

Referring now to FIG. 1c, the linkage 100 is shown where the first portion 102 is separated from the second portion 110.

Figure 2:
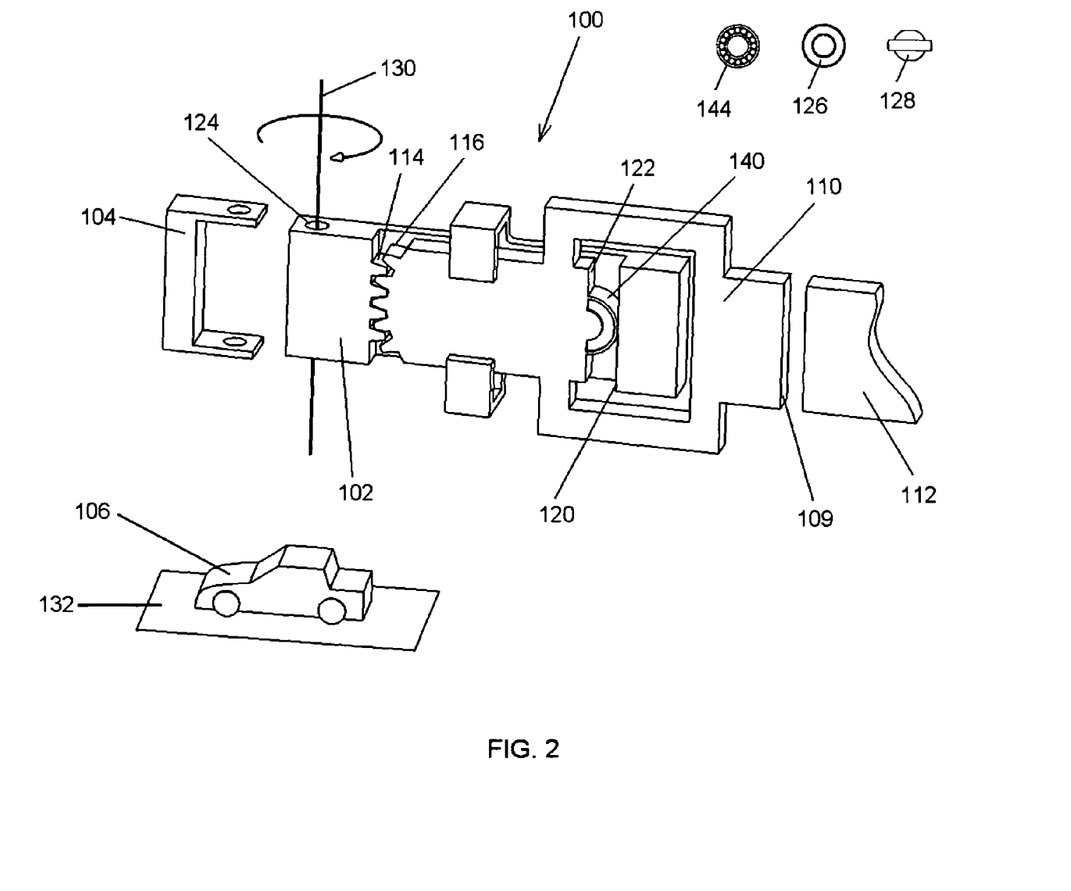
FIG. 2 shows a perspective view of the linkage according to a preferred embodiment.

Referring now to FIG. 2, according to an embodiment, the first portion 102 of the linkage 100 comprises a first rotatable connection 124 which rotatably connects the first portion 102 to the frame 104. Rotatable connections known in the art may be used such as a resilient bushing 126, or a spherical bearing 128 but not limited to these. The first rotatable connection 124 includes one axis which is a first rotational axis 130. The first rotational axis 130 is substantially perpendicular to a horizontal plane 132 of the vehicle 106. A benefit of a first rotatable connection 124 at the frame 104 is to allow additional movement of the linkage 100 when operating in certain suspension systems. Historically for example, a lower trailing arm in a four wheeled vehicle three point rear suspension system with a panhard bar requires the lower trailing arm to have more than one rotational axis at the frame connection. A one axis only pivot connection would bind the system as the suspension traveled, particularly due to the panhard bar slightly shifting the rear end sideways during travel. A resilient bushing 126 is typically used in this system which adds additional movement. This is known to those in the art. The second portion 110 of the linkage 100 comprises a second rigid connection 109 to an unsprung mass component 112. The first portion 102 further comprises a first surface 120 and the second portion 110 further comprises a second surface 122. The second surface 122 further includes a bearing 140. One benefit of using a bearing 140 is to reduce friction when the second surface 122 is in contact with the first surface 120. The first surface 120 and the bearing 140 are configured to slide against each other in order to regulate backlash and maintain engagement between the first toothed surface 114 and the second toothed surface 116.

Figure 3A:
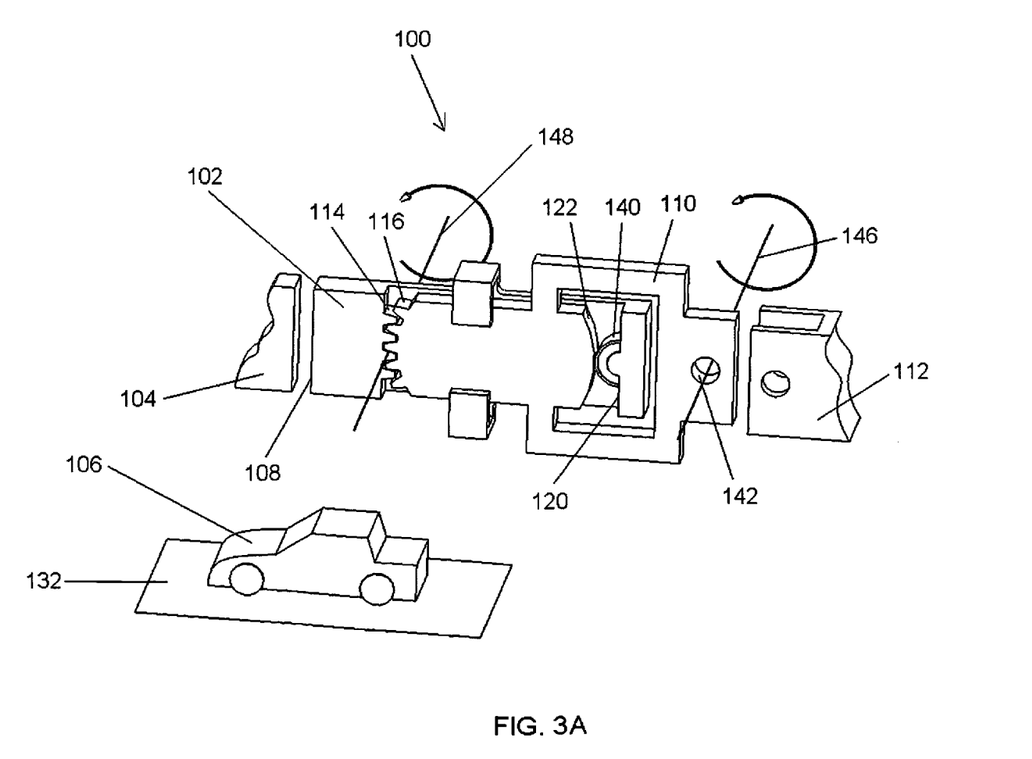
FIG. 3a shows a perspective view of the linkage according to a preferred embodiment.

Referring now to FIG. 3a, according to an embodiment, the second portion 110 of the linkage 100 comprises a second rotatable connection 142 which rotatably connects the second portion 110 to an unsprung mass component 112. Rotatable connections known in the art may be used such as a bushing, or a bearing. A bushing may include a resilient bushing 126 and a bearing may include a ball bearing 144 but not limited to these. The second rotatable connection 142 includes one second rotational axis 146. The second rotational axis 146 is substantially parallel to a horizontal plane 132 of the vehicle 106. An example that would benefit from a second rotational connection 142 having one second rotational axis 146 rotatably connecting an unsprung mass component 112 would be in a rear suspension system of a motorcycle where its trailing arm connects to its rear wheel.

A third rotational axis 148 is also shown. This third rotational axis 148 is located between the first toothed surface 114 and the second toothed surface 1 6. The first portion 102 is capable of rotating in respect to the second portion 110 about the third rotational axis 148. The third rotational axis 148 is substantially parallel to a horizontal plane 132 of a vehicle 106 and is capable of moving during suspension travel when used in a suspension system. Although the third rotational axis 148 is capable of moving, it will remain between the first toothed surface 114 and the second toothed surface 116.

The first portion 102 of the linkage 100 comprises a first rigid connection 108 to the frame 104. The first portion 102 further comprises a first surface 120 and the second portion 110 further comprises a second surface 122. The first surface 120 further includes a bearing 140. One benefit of using a bearing 140 is to reduce friction when the second surface 122 is in contact with the first surface 120. The second surface 122 and the bearing 140 are configured to slide against each other in order to regulate backlash and maintain engagement between the first toothed surface 114 and the second toothed surface 116.

Figure 3B:
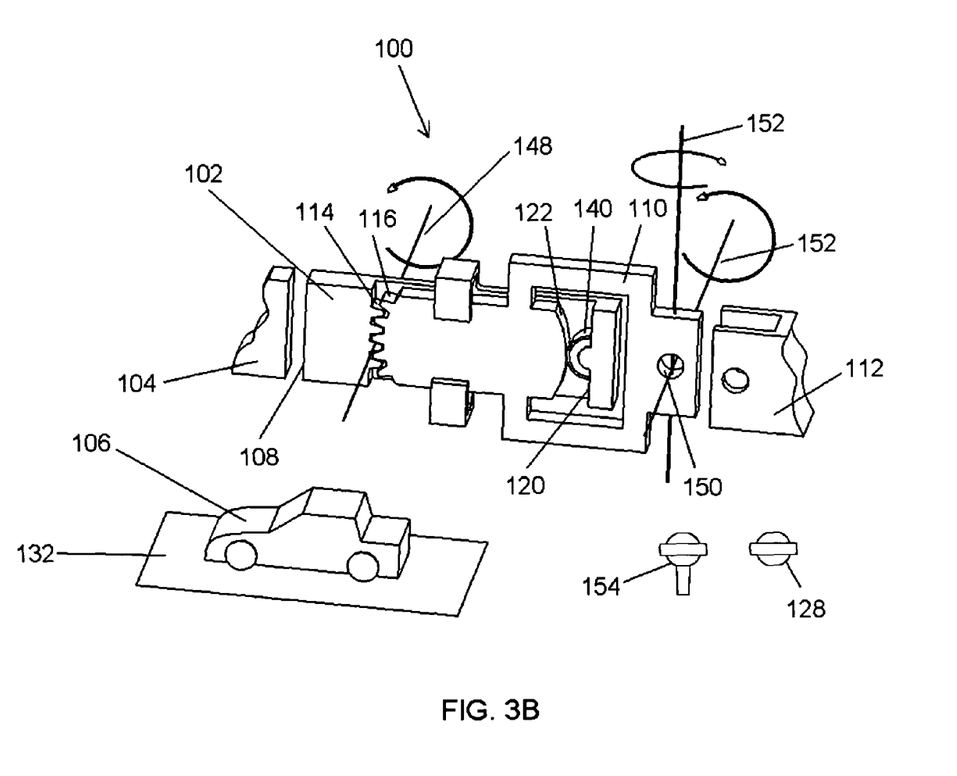
FIG. 3b shows a perspective view of the linkage according to a preferred embodiment.

Referring now to FIG. 3b, according to an embodiment, the second portion 110 of the linkage 100 comprises a third rotatable connection 150 which rotatably connects the second portion 110 to an unsprung mass component 112. This third rotatable connection 150 however, comprises a plurality of fourth rotational axis 152. This may be used instead of the second rotatable connection 142 as described in FIG. 3a. Rotatable connections with a plurality of rotational axis known in the art may be used such as a ball joint 154 or a spherical bearing 128 but not limited to these. An example of where a rotatable connection having a plurality of axes may be used is in a double wishbone front suspension system of a four wheel vehicle. Upper and lower control arms are typically connected to a spindle. It is necessary for this connection to have a plurality of rotational axis to allow for suspension travel and for the rotation of the spindle for steering of the vehicle.

Figure 4:
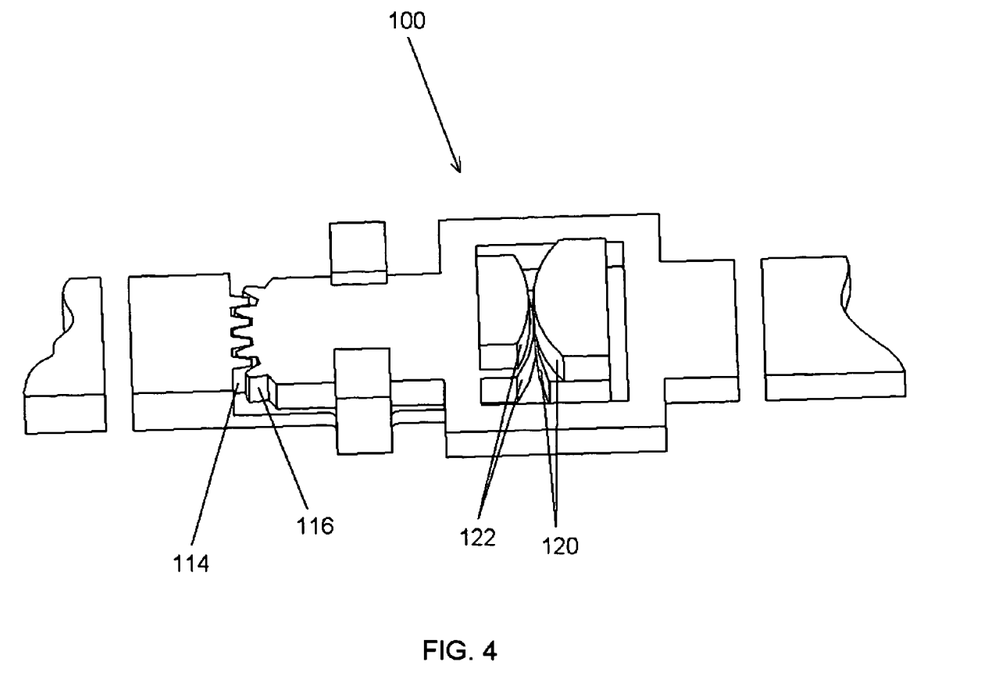
FIG. 4 shows a perspective view of the linkage according to a preferred embodiment.

Referring now to FIG. 4, according to an embodiment, the linkage 100 comprises a plurality of first surface 120 and second surface 122. The first surface 120 and the second surface 122 are configured to slide against each other in order to regulate backlash and maintain engagement between the first toothed surface 114 and the second toothed surface 116.

Figure 5:
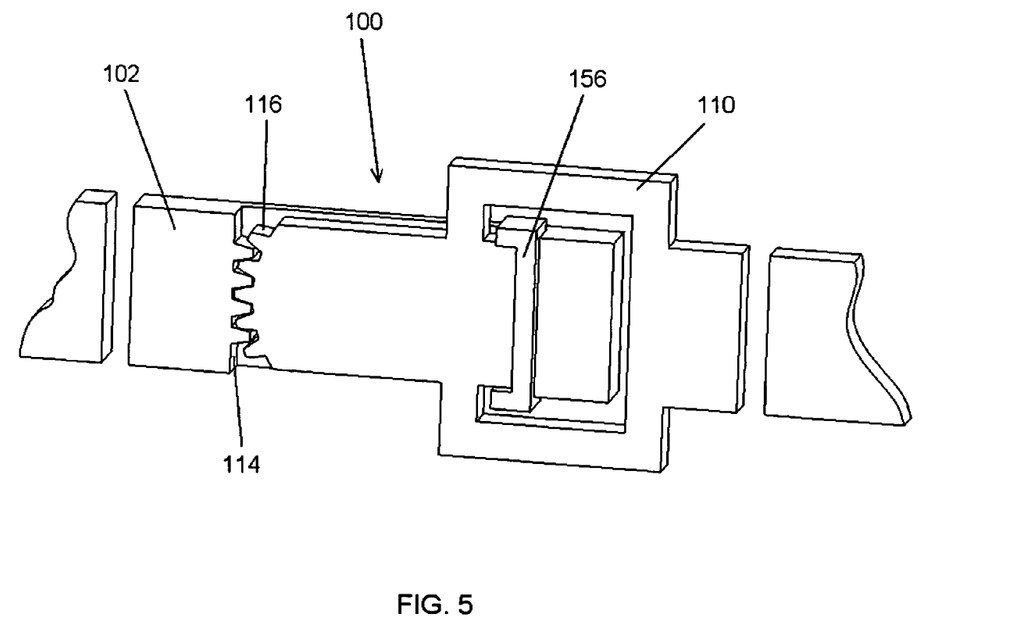
FIG. 5 shows a perspective view of the linkage according to a preferred embodiment.

Referring now to FIG. 5, according to an embodiment, the linkage 100 comprises a resilient member 156. The resilient member 156 is configured to resiliently connect the first portion 102 to the second portion 110. The resilient connection further allows the first toothed surface 114 and second toothed surface 116 to rotatably mesh and maintain engagement. It further regulates the backlash between the first toothed surface 114 and the second toothed surface 116.

Figure 6A:
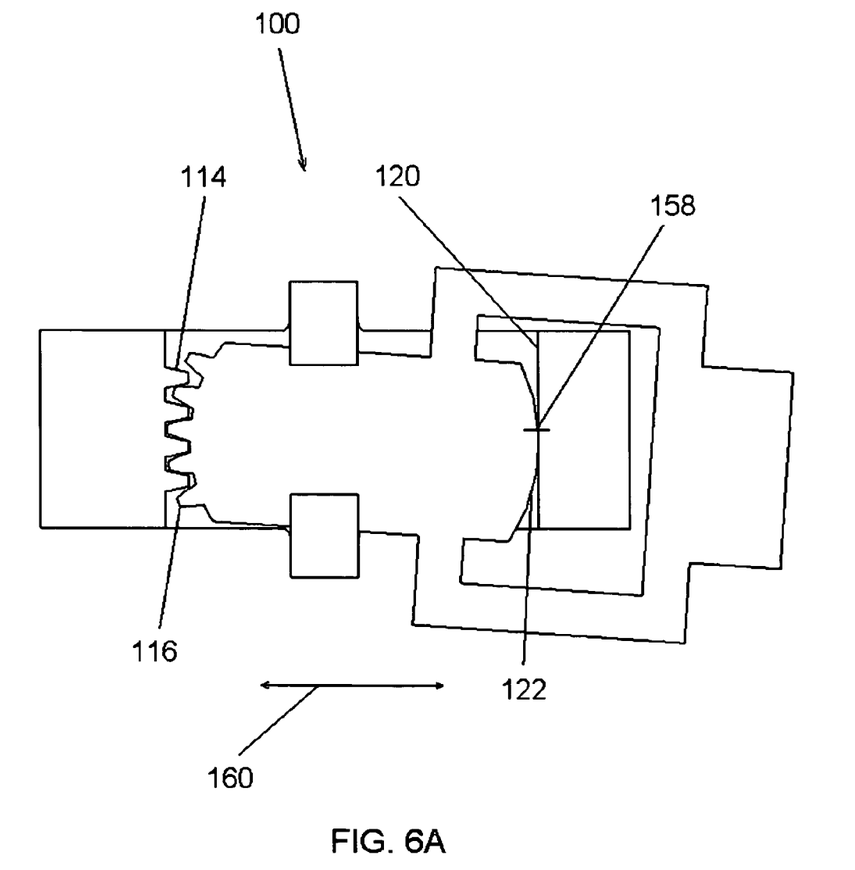
FIG. 6a shows a side view of the linkage according to a preferred embodiment.
Figure 6B:
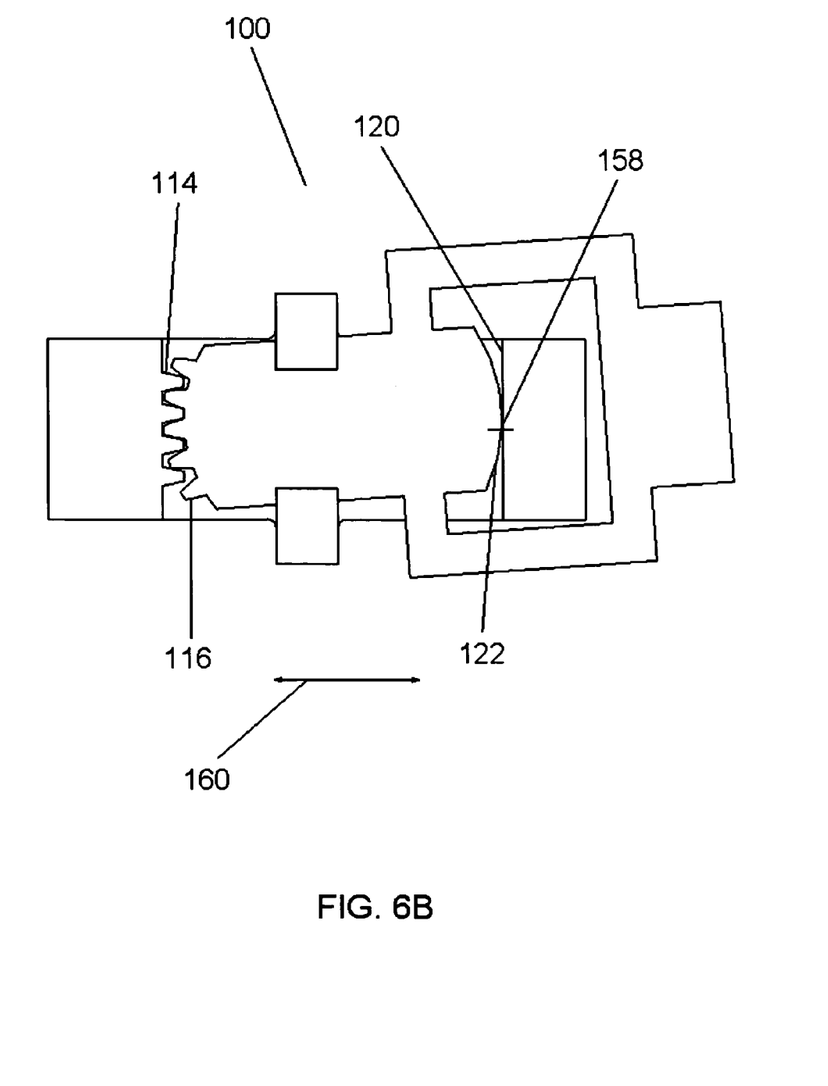
FIG. 6b shows a side view of the linkage according to a preferred embodiment.

Referring now to FIG. 6a and FIG. 6b, according to an embodiment, FIG. 6a shows one position of the first surface 120 in respect to the second surface 122. FIG. 6b shows another position of the first surface 120 in respect to the second surface 122. Referring to FIG. 6a and FIG. 6b, the first surface 120 and second surface 122 each have a contact area 158 in which they make contact with each other in order to regulate backlash and maintain engagement between the first toothed surface 114 and the second toothed surface 116. The contact area 158 on the first surface 120 is configured to substantially remain in the same position. The contact area 158 on the second surface 122 is configured to move position. The contact area 158 is the area where a direction of force 160 may transfer between the first surface 120 and the second surface 122. Some of the forces may come from acceleration, braking, and lateral forces but not limited to these.

Figure 7A:
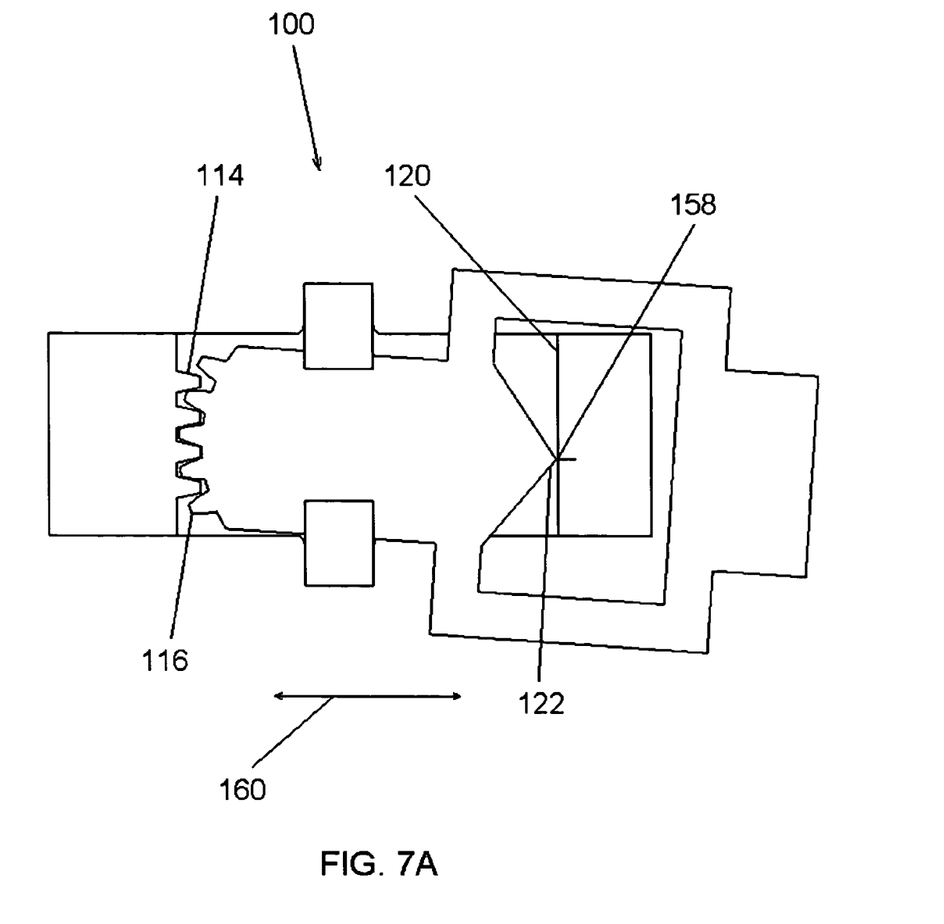
FIG. 7a shows a side view of the linkage according to a preferred embodiment.
Figure 7B:
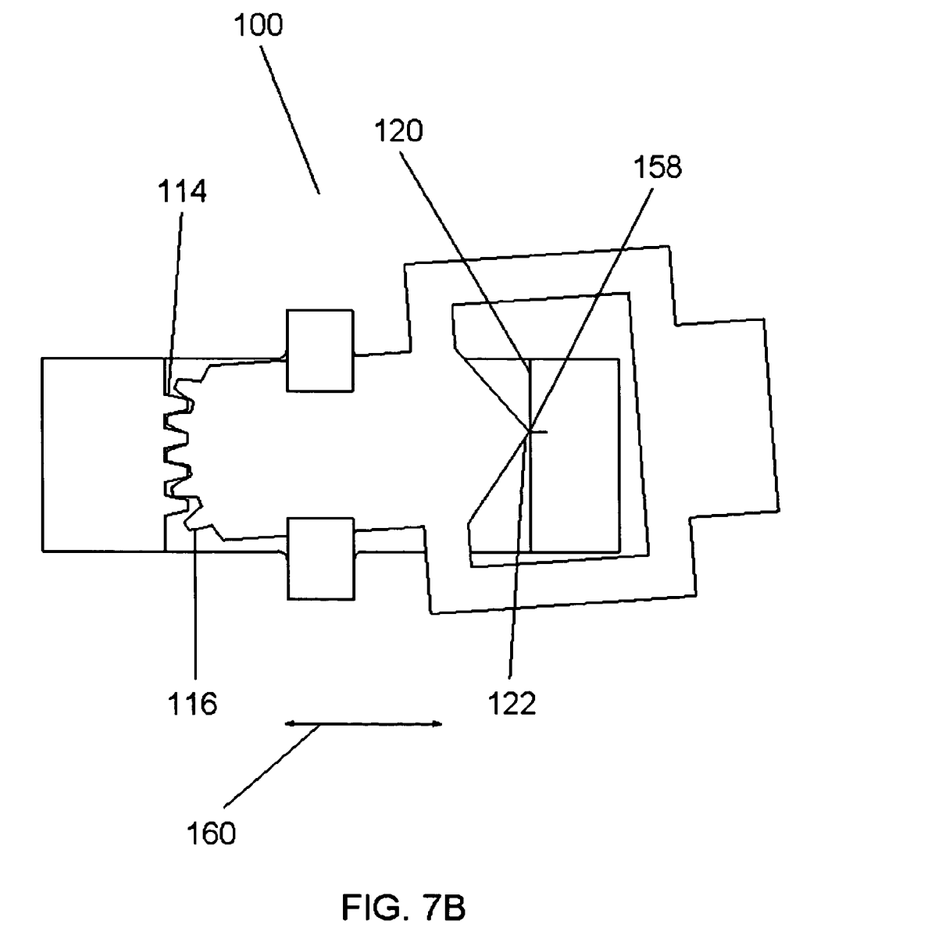
FIG. 7b shows a side view of the linkage according to a preferred embodiment.

Referring now to FIG. 7a and FIG. 7b, according to an embodiment, FIG. 7a shows one position of the first surface 120 in respect to the second surface 122. FIG. 7b shows another position of the first surface 120 in respect to the second surface 122. Referring to FIG. 7a and FIG. 7b, the first surface 120 and second surface 122 each have a contact area 158 in which they make contact with each other in order to regulate backlash and maintain engagement between the first toothed surface 114 and the second toothed surface 116. The contact area 158 on the second surface 122 is configured to substantially remain in the same position. The contact area 158 on the first surface 120 is configured to move position. The contact area 158 is the area where a direction of force 160 may transfer between the first surface 120 and the second surface 122. Some of the forces may come from acceleration, braking, and lateral forces but not limited to these.

Figure 8A:
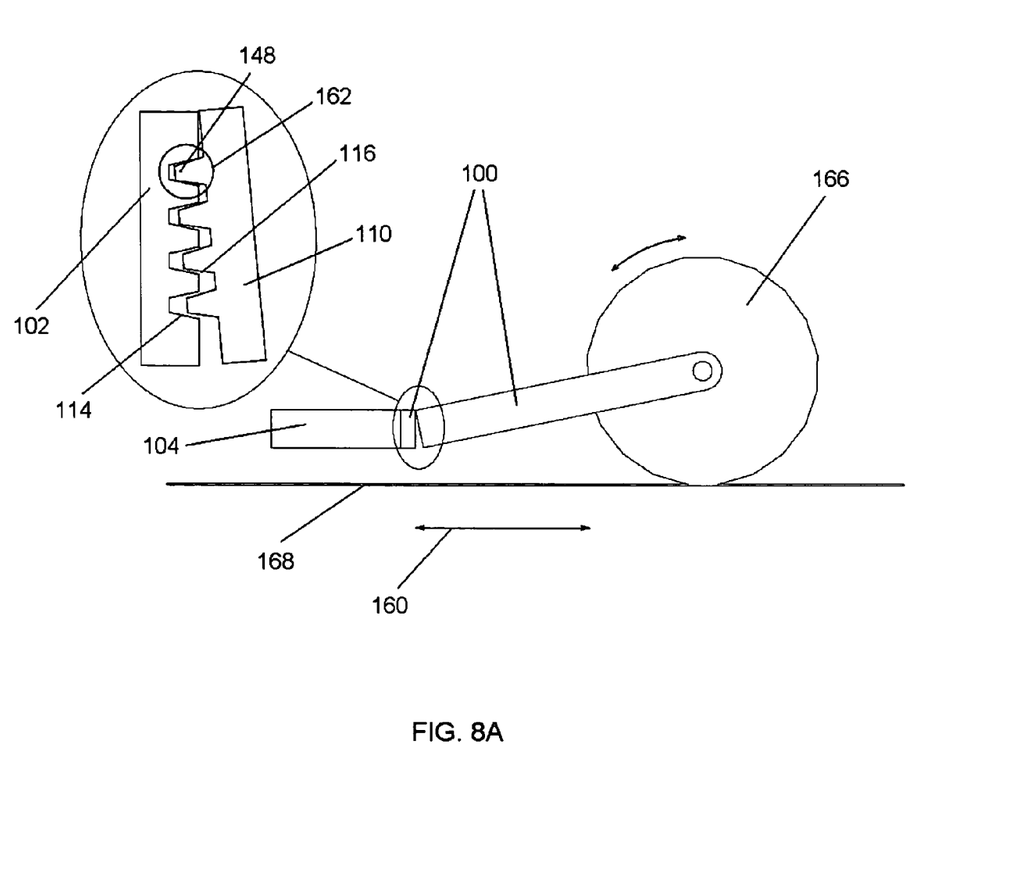
FIG. 8a shows a side view of the linkage in a vehicle suspension system.
Figure 8B:
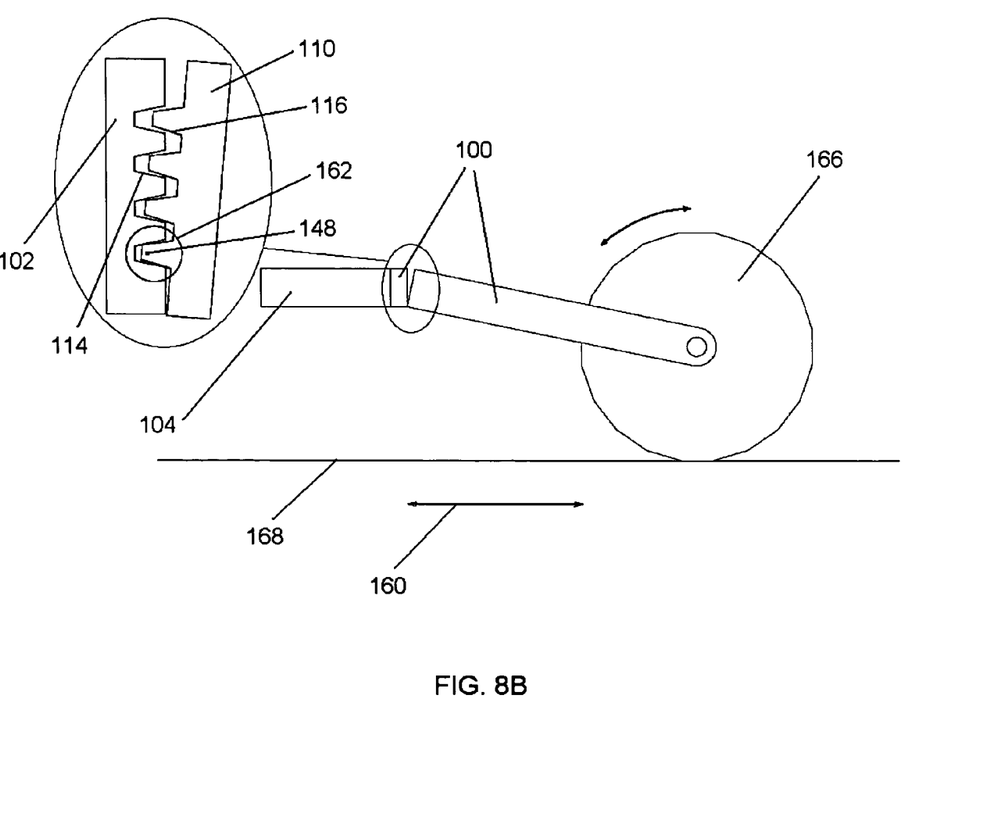
FIG. 8b shows a side view of the linkage in a vehicle suspension system.

Referring now to FIGS. 8a and 8b, a linkage 100 is shown in a vehicle suspension system which includes a frame 104 and a wheel 166 which is rotatably mounted to the linkage 100. The linkage 100 is rigidly attached to the frame 104. The linkage 100 includes a first portion 102 and a second portion 110. The first portion 102 is attached to a first toothed surface 114, and the second portion 110 is attached to a second toothed surface 116. FIG. 8a shows one position of a pivot area 162 and FIG. 8b shows another position of the pivot area 162. The pivot area 162 is the area in which the first toothed surface 114 makes contact with the second toothed surface 116. The first toothed surface 114 is rotatable in relation to the second toothed surface 116 within the pivot area 162. The pivot area 162 is the area in which a third rotational axis 148 is located. The third rotational axis 148 is shown in FIGS. 8a and 8b located within the pivot area 162 but not necessarily at its precise location within the pivot area 162. The third rotational axis 148 is more precisely the area where the first toothed surface 114 is rotatable in relation to the second toothed surface 116. This area is also the area in which a direction of force 160 may transfer between the first toothed surface 114 and the second toothed surface 116. Some of the forces may come from acceleration, braking, and lateral forces but not limited to these. In FIG. 8a, the frame 104 is shown in one position relative to the ground surface 168 and FIG. 8b shows another position of the frame 104 relative to the ground surface 168. This position moves during suspension travel.

Figure 9:
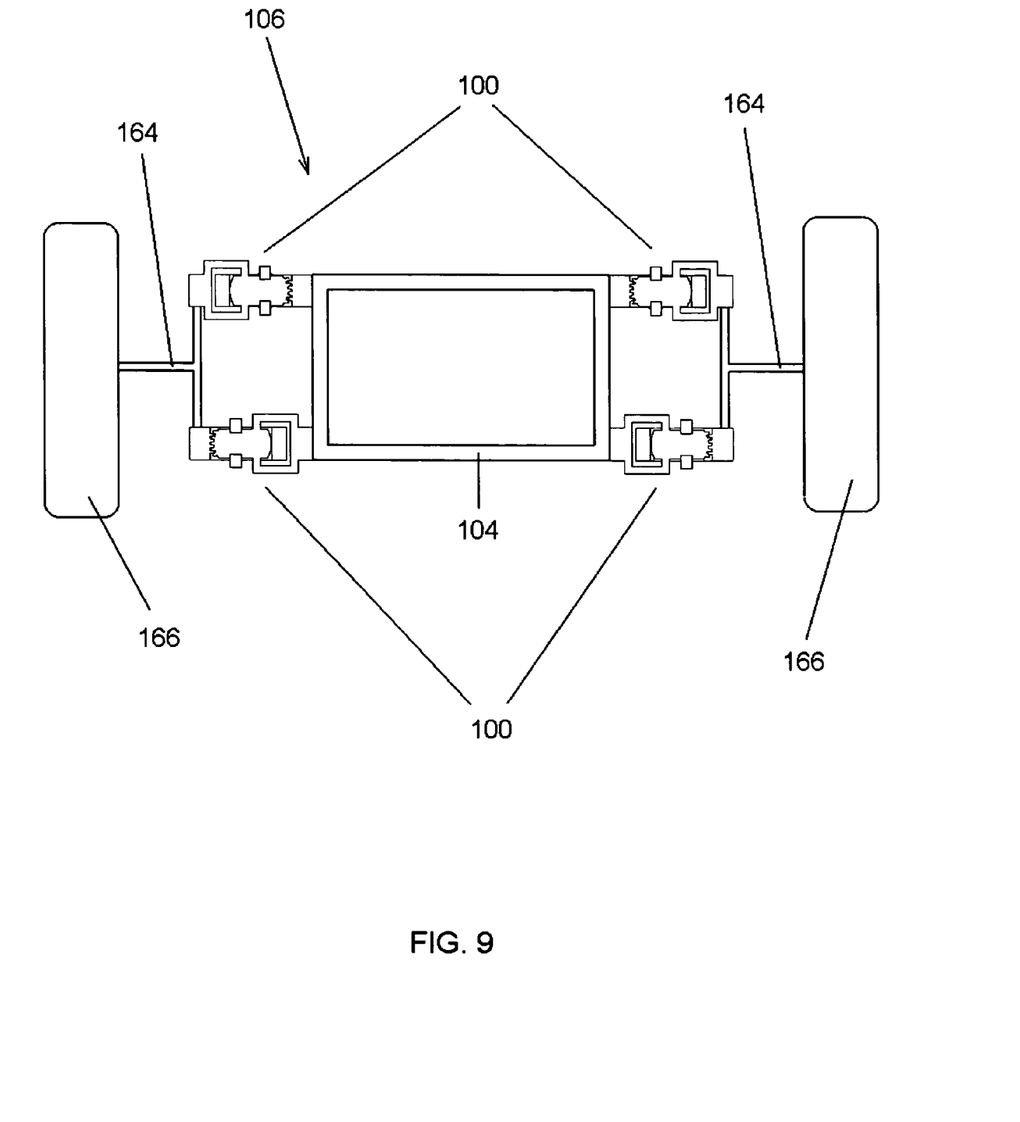
FIG. 9 shows a front view of a double wishbone suspension system employing the linkage described herein.

Referring now to FIG. 9, according to an embodiment, a vehicle suspension system includes a linkage 100 connected to a frame 104 of a vehicle 106, a spindle 164 connected to the linkage 100, and a wheel 166 rotatably connected to the spindle 164.

Of course, the various aspects of the embodiments shown in FIGS. 1-9 may be mixed and matched as desired, where possible. Further, the present invention is not limited to only those embodiments shown.

I claim:

1. A linkage for connecting a frame of a vehicle to an unsprung mass component of said vehicle, comprising:
   a first portion connectable to said frame, and comprising a first toothed surface; and
   a second portion connectable to said unsprung mass component, and comprising a second toothed surface,
   wherein said first portion is rotatably connected to said second portion and configured to be rotatable between said first toothed surface and said second toothed surface,
   wherein said first portion comprises a first rotatable connection to said frame, said first rotatable connection comprising one first rotational axis, and
   wherein said first toothed surface and said second toothed surface are configured to mesh with each other and maintain engagement.

2. The linkage as claimed in claim 1, wherein said first rotational axis is substantially perpendicular to a horizontal plane of said vehicle.

3. The linkage as claimed in claim 1, wherein said first rotatable connection comprises a resilient bushing.

4. The linkage as claimed in claim 1, wherein said first rotatable connection comprises a bearing.

5. A linkage for connecting a frame of a vehicle to an unsprung mass component of said vehicle, comprising:
   a first portion connectable to said frame, and comprising a first toothed surface; and
   a second portion connectable to said unsprung mass component, and comprising a second toothed surface,
   wherein said first portion is rotatably connected to said second portion and configured to be rotatable between said first toothed surface and said second toothed surface,
   wherein said first toothed surface and said second toothed surface are configured to mesh with each other and maintain engagement, and
   wherein said first portion further comprises a first surface, and said second portion further comprises a second surface, wherein said first surface is configured to slide against said second surface and maintain engagement between said first toothed surface and said second toothed surface.

6. The linkage as claimed in claim 5, wherein said first portion comprises a first rigid connection to said frame.

7. The linkage as claimed in claim 5, wherein said second portion comprises a second rigid connection to said unsprung mass component.

8. The linkage as claimed in claim 5, wherein said second portion comprises a third rotatable connection, said third rotatable connection comprising a plurality of fourth rotational axes.

9. The linkage as claimed in claim 5, wherein said first toothed surface comprises at least one tooth and said second toothed surface comprises at least two teeth.

10. The linkage as claimed in claim 5, wherein said second toothed surface comprises at least one tooth and said first toothed surface comprises at least two teeth.

11. The linkage as claimed in claim 5, wherein said first toothed surface comprises an involute gear tooth profile.

12. The linkage as claimed in claim 5, wherein said second toothed surface comprises an involute gear tooth profile.

13. The linkage as claimed in claim 5, wherein said first surface comprises a bearing.

14. The linkage as claimed in claim 5, wherein said second surface comprises a bearing.

15. The linkage as claimed in claim 5, wherein said first portion comprises a plurality of said first surface and said second portion comprises a plurality of said second surface.

16. The linkage as claimed in claim 5, wherein said second portion comprises a second rotatable connection to said unsprung mass component.

17. The linkage as claimed in claim 16, wherein said second rotatable connection comprises a resilient bushing.

18. The linkage as claimed in claim 16, wherein said second rotatable connection comprises a bearing.

19. The linkage as claimed in claim 16, wherein said second rotatable connection comprises exactly one second rotational axis.

20. The linkage as claimed in claim 19, wherein said second rotational axis is substantially parallel to a horizontal plane of said vehicle.

21. The linkage as claimed in claim 5, wherein said linkage further comprises a resilient portion, said resilient portion configured to resiliently attach said first portion to said second portion.

22. The linkage as claimed in claim 5, wherein said first portion is rotatably connected to said second portion about a third rotational axis between said first toothed surface and said second toothed surface.

23. The linkage as claimed in claim 22, wherein said third rotational axis is substantially parallel to said horizontal plane of said vehicle.

24. The linkage as claimed in claim 5, wherein said first portion comprises a first rotatable connection to said frame, said first rotatable connection comprising one first rotational axis.

25. The linkage as claimed in claim 24, wherein said first rotational axis is substantially perpendicular to a horizontal plane of said vehicle.

26. The linkage as claimed in claim 24, wherein said first rotatable connection comprises a resilient bushing.

27. The linkage as claimed in claim 24, wherein said first rotatable connection comprises a bearing.

28. A vehicle suspension system comprising:
a vehicle further comprising a frame;
an unsprung mass component;
and the linkage as claimed in claim 5;
wherein the linkage is connected between the frame and an unsprung mass component of the vehicle.

* * * * *